United States Patent [19]

Kawabe et al.

[11] Patent Number: 4,706,979

[45] Date of Patent: Nov. 17, 1987

[54] STEERING CONTROL SYSTEM FOR WHEELED VEHICLE

[75] Inventors: Taketoshi Kawabe, Tokyo; Ken Ito, Yokohama, both of Japan

[73] Assignee: Nissan Motor Co., Ltd., Japan

[21] Appl. No.: 883,719

[22] Filed: Jul. 9, 1986

[30] Foreign Application Priority Data

Jul. 12, 1985 [JP] Japan ................................ 60-152557
Jul. 13, 1985 [JP] Japan ................................ 60-153368

[51] Int. Cl.$^4$ ............................................. B62D 6/02
[52] U.S. Cl. .................................... 280/91; 364/424
[58] Field of Search ................. 280/91; 180/142, 140; 318/580, 586, 585; 364/424, 425

[56] References Cited

U.S. PATENT DOCUMENTS 3,866,706  2/1975  Lincke et al. ...................... 180/142
4,418,780  12/1983  Ito et al. ............................ 180/142
4,441,572  4/1984  Ito et al. ............................ 180/140

OTHER PUBLICATIONS

Gakujutsu Koenkai Maezurishu 842058, pp. 307-310—Society of Automotive Engineers of Japan.

Primary Examiner—John J. Love
Assistant Examiner—Karin L. Ferriter
Attorney, Agent, or Firm—Leydig, Voit & Mayer

[57] ABSTRACT

A control system for steering a controlled vehicle has a steering wheel angle sensor, a vehicle speed sensor, an actuator for altering a rear wheel steer angle, and a processor such as a microcomputer. The processor has a reference supplying section for determining a desired value of a vehicle motion variable such as a yaw rate by solving a desired mathematical vehicle model representing a postulated vehicle, and an actual motion estimating section for determining an estimated value of the vehicle motion variable by solving an actual vehicle model representing the controlled vehicle. The control system alters the rear wheel steer angle so as to reduce the difference between the desired and estimated values of the motion variable.

19 Claims, 7 Drawing Figures

STEERING CONTROL SYSTEM FOR WHEELED VEHICLE

BACKGROUND OF THE INVENTION

The present invention relates to a vehicle steering control system for controlling one or more vehicle motion variables so as to achieve prescribed vehicle response characteristics by varying a manipulated quantity of a steering system, and especially to a vehicle steering control system having an internal feedback loop.

The possibility of improvement in steering characteristics of a conventional two wheel steer vehicle (in which only front wheels are steered by angular displacement of a steering wheel) is limited because of the very nature of the two wheel steer vehicle.

A conventional example of a control system for a four wheel steer vehicle is disclosed in "Gakujutsu Kōenkai Maezurishū 842058" (pages 307-310) published by Society of Automotive Engineers of Japan in 1984. The control system of this example alters a rear wheel steer angle by sensing an actual yaw rate with a yaw rate sensor and feeding back the sensed value of the yaw rate so as to maintain a steady state side slip angle equal to zero.

However, this system requires a sensor for sensing a vehicle motion variable such as a yaw rate, so that the cost and the accuracy of such a motion variable sensor are troublesome. The disadvantage is further inceased when the system requires a plurality of the vehicle motion variable sensors. Furthermore, noise is superimposed on the sensor signal by vehicle vibrations, and the delay in the feedback loop is increased.

SUMMARY OF THE INVENTION

It is an object of the present invention to provide a vehicle control system for controlling a vehicle motion variable which requires no sensor for sensing the controlled vehicle motion variable.

According to the present invention a control system for steering a controlled vehicle having at least one first wheel such as front wheels and at least one second wheel such as rear wheels, comprises a steering input means, actuating means and control means. The steering input means determines a steering input quantity such as a steering wheel angle of the controlled vehicle. The actuating means steers the controlled vehicle by varying a predetermined manipulated variable such as a second wheel steer angle. The control means produces a control signal to command the actuating means in accordance with the steering input quantity. The control means comprises first reference supplying means, actual motion variable estimating means, first comparing means and target manipulated variable determining means. The first reference supplying means determines a desired value of a predetermined first vehicle motion variable in accordance with a first desired vehicle model representing a first desired vehicle. The actual motion estimating means determines an estimated value of the first motion variable corresponding to the steering input quantity in accordance with an actual vehicle model representing the controlled vehicle. The first comparing means compares the desired and estimated values of the first motion variable. The target manipulated variable determining means varies the manipulated variable by producing the control signal representing a target value of the manipulated variable so as to reduce a difference between the desired and estimated values of the first motion variable.

The control system may further comprises means for sensing a vehicle speed of the controlled vehicle. In this case, the first reference supplying means determines the desired value corresponding to the steering input quantity and the vehicle speed, and the actual motion estimating means determines the estimated value corresponding to the steering input quantity and the vehicle speed.

DETAILED DESCRIPTION OF THE INVENTION

Figure 1:
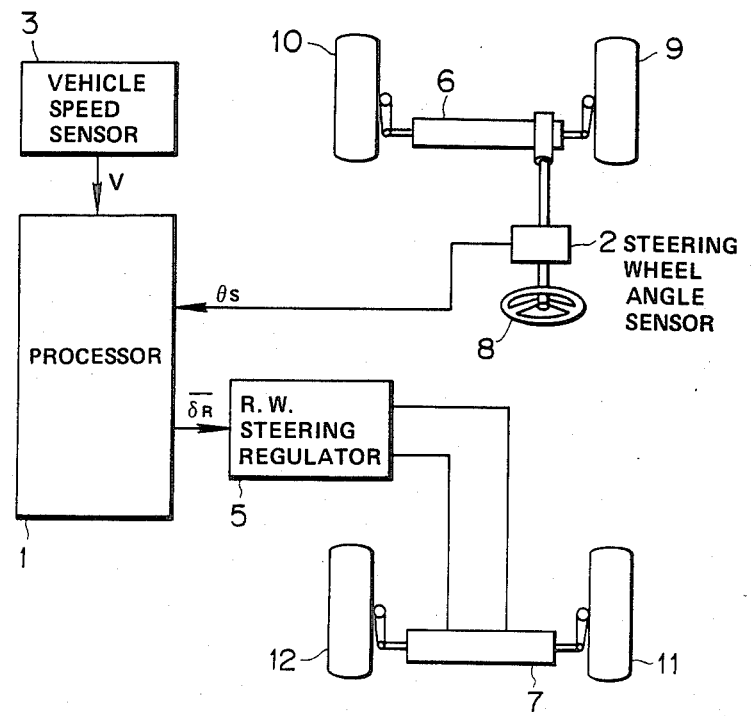
FIG. 1 is a view showing a control system of a first or second embodiment of the present invention.
Figure 2:
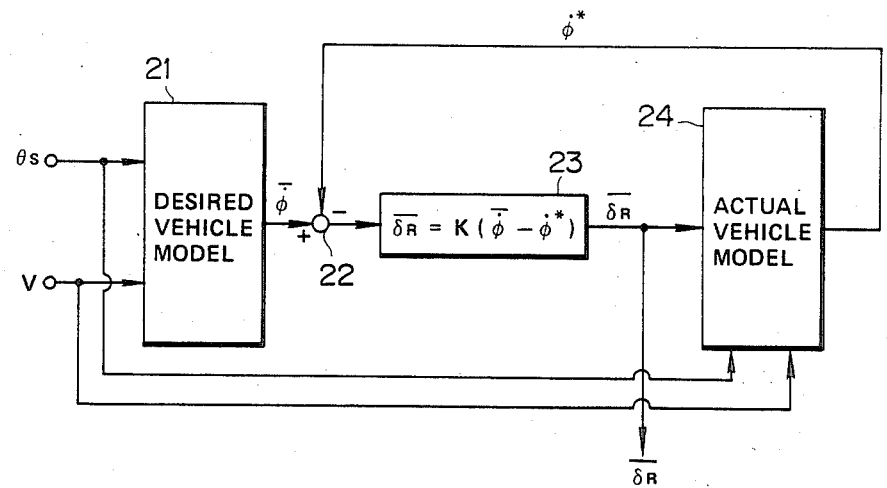
FIG. 2 is a block diagram showing a control of the first embodiment.

A first embodiment of the present invention is shown in FIGS. 1 and 2.

FIG. 1 shows a controlled vehicle equipped with a control system of the first embodiment. A processor 1 is made up of a microcomputer or other electric circuitry. The processor 1 receives a steering wheel angle $\delta_s$ of a steering wheel 8 sensed by a steering wheel angle sensor 2, and a vehicle speed V of the controlled vehicle sensed by a vehicle speed sensor 3, and outputs a target rear wheel steer angle $\bar{\delta}_R$ by performing mathematical operations.

Front wheels 9 and 10 of the controlled vehicle of this embodiment are steered through a conventional type mechanical steering linkage 6 so that a front wheel steer angle is made equal to a value corresponding to the angular displacement of the steering wheel 8.

Rear wheels 11 and 12 are steered through a hydraulic steering unit 7, which is controlled by a rear wheel steering regulator 5. The rear wheel steering regulator 5 controls the hydraulic unit 7 by varying a fluid pressure supplied to the unit 7 in accordance with the target rear wheel steer angle $\bar{\delta}_R$ sent from the processor 1. (The steering regulator 5 and the hydraulic unit 7 are disclosed more in detail in a Japanese patent application No. 59-188153, a prior filed, commonly owned U.S. application Ser. No. 773,650 filed Sept. 9, 1985, U.S. Pat. No. 4,679,809, a West German Offenlegungsshrift No. 35 32 247 published on Mar. 20, 1986, which are all cognate with one another. The disclosures of these documents are herein incorporated by reference.)

FIG. 2 shows a control performed in the processor 1 of the first embodiment.

A reference supplying section 21 determines a desired yaw rate value $\bar{\phi}$ corresponding to the steering wheel angle $\theta_s$ and the vehicle speed V by performing mathematical operations according to a predetermined desired vehicle model representing a desired vehicle having desired cornering characteristics.

The desired vehicle model is a simulation model in which desired characteristics and vehicle parameters of a simulated vehicle are set as mathematical relationships (or operational circuits) and constants (or circuit constants). By receiving the steering wheel angle $\theta_s$ and the vehicle speed V, the desired vehicle model provides a value of a vehicle motion variable which would be produced by the desired vehicle. In this embodiment, the section 21 determines the value of the yaw rate of the desired vehicle by using the desired vehicle model. and delivers the thus-determined value as the desired yaw rate value $\bar{\phi}$.

The desired yaw rate value $\bar{\phi}$ is determined by using the following equations:

$$I_{K1}\ddot{\delta}_{F1} = N_1 K_{S1}(\theta_S - N_1\delta_{F1}) - D_{K1}\dot{\delta}_{F1} - 2\xi_1 C_{F1} \tag{1}$$

$$M_1(\dot{y}_1 + \phi_1 V) = 2C_{F1} + 2C_{R1} \tag{2}$$

$$I_{Z1}\ddot{\phi}_1 = 2L_{F1}C_{F1} - 2L_{R1}C_{R1} \tag{3}$$

$$\beta_{F1} = \delta_{F1} - (\dot{y}_1 + L_{F1}\phi_1)/V \tag{4}$$

$$\beta_{R1} = -(\dot{y}_1 - L_{R1}\phi_1)/V \tag{5}$$

$$C_{F1} = K_{F1}\beta_{F1} \tag{6}$$

$$C_{R1} = K_{R1}\beta_{R1} \tag{7}$$

$$\bar{\phi} = \phi_1 \tag{8}$$

where $\delta_{F1}$ = a steer angle of the front wheels of the desired vehicle model (In this embodiment, the desired vehicle is a two-wheel steer vehicle.), $\phi_1$ = a yaw rate of the desired vehicle model, $\ddot{\phi}_1$ = a yaw acceleration of the desired vehicle model, $\dot{y}_1$ = a side slipping speed of the desired vehicle model, $\ddot{y}_1$ = a side slipping acceleration of the desired vehicle model, $\beta_{F1}$ = a side slip angle of the front wheels of the desired vehicle model, $\beta_{R1}$ = a side slip angle of the rear wheels of the desired vehicle model, $C_{F1}$ = a cornering force of each of the front wheels of the desired vehicle model, $C_{R1}$ = a cornering force of each of the rear wheels of the desired vehicle model.

Each of these variables is treated as a variable varying with time in solving these equations.

In this embodiment, the vehicle parameters of the desired vehicle model are as follows:

$I_{Z1}$ = a yawing moment of inertia of the desired vehicle model, $M_1$ = a vehicle mass of the desired vehicle model, $L_1$ = a wheel base of the desired vehicle model, $L_{F1}$ = a distance between a front axle and a center of gravity of the desired vehicle model.

$L_{R1}$ = a distance between a rear axle and the center of gravity of the desired vehicle model, $I_{K1}$ = a moment of inertia about a kingpin of the desired vehicle model, $K_{S1}$ = a steering stiffness of the desired vehicle model, $D_{K1}$ = a viscosity coefficient of a steering system of the desired vehicle model, $\xi_1$ = a trail of the desired vehicle model, $N_1$ = an overall steering (gear) ratio of the desired vehicle model, $K_{F1}$ = a cornering power of each of front wheels of the desired vahicle, $K_{R1}$ = a cornering power of each of rear wheels of the desired vehicle.

Each of the vehicle parameter is treated as a constant in solving the equations (1)–(8).

The desired yaw rate value $\bar{\phi}$ determined by the section 21 is inputted to a subtracter 22, which determines a difference $(\bar{\phi} - \phi^*)$ between the desired yaw rate value $\bar{\phi}$ and an estimated yaw rate value $\phi^*$ determined by an actual motion variable estimating section 24.

The output of the subtracter 22 is inputted to a controlling section 23 in which the difference $(\bar{\phi} - \phi^*)$ is multiplied by a constant K. The section 23 sends the product $K(\bar{\phi} - \phi^*)$ as the target rear wheel steer angle $\bar{\delta}_R$ to the rear wheel steering regulator 5.

In response to the signal from the section 23, the steering regulator 5 alters the actual rear wheel steer angle of the controlled vehicle by supplying the fluid pressure proportional to the target rear wheel steer angle $\bar{\delta}_R$ to the hydraulic unit 7.

The actual motion estimating section 24 receives the target rear wheel steer angle $\bar{\delta}_R$ from the section 23, estimates a value of the yaw rate of the controlled vehicle corresponding to the target rear wheel steer angle $\bar{\delta}_R$ by performing mathematical operations. and outputs the result of the mathematical operations as the estimated yaw rate value $\phi^*$.

The estimated yaw rate value $\phi^*$ is determined in accordance with an actual vehicle model representing the vehicle controlled by the control system of this embodiment. The actual vehicle model is determined by one or more relationships expressing the characteristics of the controlled vehicle, and the vehicle parameters of the controlled vehicle. For example. the vehicle parameters of the controlled vehicle are set equal to values determined when the vehicle is shipped. In this embodiment, the following equations are used for determining the estimated yaw rate value $\phi^*$.

$$V^*_y(t) = V^*_y(t-\Delta t) + \Delta t \cdot \dot{V}^*_y \tag{9}$$

$$\phi^*(t) = \phi^*(t-\Delta t) + \Delta t \cdot \dot{\phi}^*(t) \tag{10}$$

$$\beta_F = (\phi_s/N) - (V^*_y(t) + L_F\phi^*(t))/V \tag{11}$$

$$\beta_R = \delta_R - (V^*_y(t) - L_R\phi^*(t))/V \tag{12}$$

$$C_F = eK_F\beta_F \tag{13}$$

$$C_R = K_R \cdot \beta_R \tag{14}$$

$$\dot{V}^*_y(t) = (2C_F + 2C_R)/M - V \cdot \phi^* \tag{15}$$

$$\ddot{\phi}^*(t) = 2(C_F L_F - C_R L_R)/I_Z \tag{16}$$

In the equations (9)–(16):

$V^*_y$ = an estimated value of a side slipping speed of the actual vehicle model, $\Delta t$ = a time length of intervals of the operation cycles, $\beta_F$ = a side slip angle of the front wheels of the actual vehicle model, $\beta_R$ = a side slip angle of the rear wheels of the actual vehicle model, $C_F$ = a cornering force of each of the front wheels of the actual vehicle model, and $C_R$ = a cornering force of each of the rear wheels of the actual vehicle model.

In the equations (9)–(16), the following vehicle parameters are used:

$L_F$ = a distance between a front axle and a center of gravity of the actual vehicle model, $L_R$ = a distance between a rear axle and the center of gravity of the actual vehicle model, M = a vehicle mass of the actual vehicle model, N = an overall steering (gear) ratio of the actual vehicle model, $I_Z$ = a yawing moment of inertia of the actual vehicle model, $eK_F$ = a front wheel equivalent cornering power of the actual vehicle model (in which the steering stiffness is taken into account), and $K_R$ = a rear wheel cornering power of the actual vehicle model.

The estimated yaw rate value $\phi^*$ determined by the section 24 is used as a negative feedback quantity in the proportional control performed by the subtracter 22 and the section 23.

Therefore, this control system continues to steer the rear wheels 11 and 12 by outputting the target rear wheel steer angle until the estimated yaw rate vlaue $\phi^*$ of the controlled vehicle becomes equal to the desired raw rate value $\bar{\phi}$. When the difference $(\bar{\phi}-\phi^*)$ is reduced to zero, the control system stops steering the rear wheels. In this way, the control system of this embodiment makes the actual yaw rate of the controlled vehicle equal to the desired yaw rate value $\bar{\phi}$, and accordingly makes the dynamic characteristics of the controlled vehicle equal to the characteristics of the desired vehicle.

The control system of this embodiment feeds back the estimated yaw rate of the controlled vehicle in a manner of so-called internal feedback, instead of the actual value sensed by a sensor such as a yaw rate sensor. so that the feedback control of this embodiment is free from noise, and the accuracy in achieving the desired dynamic characteristic, is improved.

In the first embodiment, the yaw rate is employed as a controlled variable. However, it is optional to employ some other vehicle motion variable such as a side slip angle. In the first embodiment, the rear wheel steer angle is employed as a manipulated variable. However, the control system may be arranged to vary the front wheel steer angle of the controlled vehicle, or both of the front wheel steer angle and the rear wheel steer angle.

Figure 3:
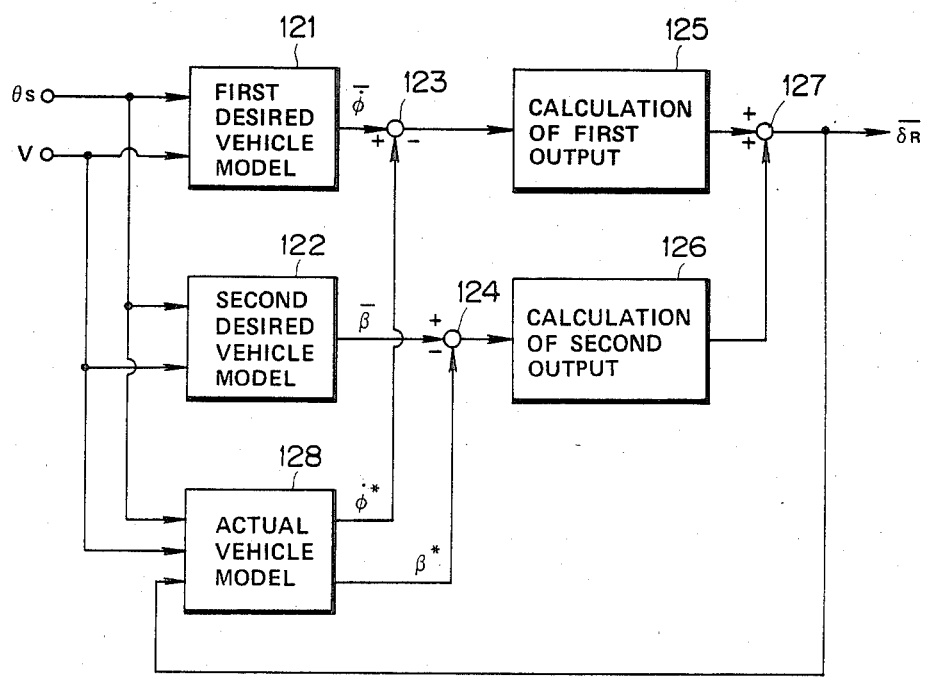
FIG. 3 is a block diagram showing a control of the second embodiment.

A second embodiment of the present invention is shown in FIGS. 1 and 3. FIG. 1 is common to both of the first and second embodiments. A control system of the second embodiment comprises processor 1, steering wheel angle sensor 2, vehicle speed sensor 3. rear wheel steering regulator 5 and hydraulic unit 7, as shown in FIG. 1. The control system of the second embodiment is different from the control system of the first embodiment only in control action performed by the processor 1.

FIG. 3 shows the functions performed by the processor 1 of the second embodiment in the form of a block diagram.

A first reference supplying section 121 determines a desired yaw rate value $\bar{\phi}$ corresponding to the steering wheel angle $\theta_s$ of the controlled vehicle sensed by the steering wheel angle sensor 2 and the vehicle speed V of the controlled vehicle sensed by the vehicle speed sensor 3, by performing mathematical operations in accordance with a predetermined first desired vehicle model representing a first desired vehicle. The first desired vehicle model is a simulation model in which desired characteristics and desired vehicle parameters are set by mathematical equations (or operational circuits) and constants (or circuit constants). The first desired vehicle model receives the steering wheel angle and the vehicle speed as inputs. and delivers the magnitude of a vehicle motion variable of the first desired vehicle resulting from the steering wheel angle and the vehicle speed. In the second embodiment, the section 121 determines the magnitude of the yaw rate of the first desired vehicle model, and outputs the thus-determined magnitude of the yaw rate as the desired yaw rate value $\bar{\phi}$.

The first reference section 121 of the second embodiment has a transfer characteristic (or function) $R\bar{\phi}(s)$ expressed as:

$$\frac{\bar{\phi}(s)}{\theta_s(s)} = R_{\bar{\phi}}(s) = G_{\bar{\phi}}(V) \frac{1}{1 + \tau s} \quad (17)$$

In the equation (17), s is a differential operator (Laplace operator or Laplacian), $G_{\bar{\phi}}(V)$ is a gain which is a function of the vehicle speed V, and $\tau$ is a time contant. As known from the equation (17), the desired yaw rate value $\bar{\phi}$ is outputted with respect to the steering angle in a manner of a first order lag.

A second reference supplying sectron 122 determines a desired side slip angle value $\bar{\beta}$ corresponding to the steering wheel angle $\theta_s$ and the vehicle speed V by performing mathematical operations in accordance with a predetermined second desired vehicle model representing a second desired vehicle the second desired vehicle model is also a simulation model.

The second reference section 122 has a transfer characteristic (or function) $R_\beta$ (s) expressed as:

$$\frac{\bar{\beta}(s)}{\theta_s(s)} = R_\beta(s) = G_\beta(V) \frac{\omega^2}{s^2 + 2\omega s + \omega^2} \quad (18)$$

Thus, the desired side slip angle value $\bar{\beta}$ is outputted with respect to the steering wheel angle $\theta_s$ in a manner of a second order lag. In the equation (18), $G_\beta(V)$ is a gain which is a function of the vehicle speed V, and $\omega$ is a natural frequency (or undamped frequency) which is a constant.

The desired yaw rate value $\bar{\phi}$ determined by the section 121 is inputted to a first subtracter 123, which compares the desired yaw rate value $\bar{\phi}$ and an estimated yaw rate value $\phi^*$ of the controlled vehicle determined by an actual vehicle motion variable estimating section 128, and determines a yaw rate difference $(\bar{\phi}-\phi^*)$. The desired side slip angle value $\bar{\beta}$ determined by the section 122 is inputted to a second subtracter 124, which compares the desired side slip angle value $\bar{\beta}$ and an estimated side slip angle value $\beta^*$ determined by the actual vehicle motion variable estimating section 128, and determines a side slip angle difference $(\bar{\beta}-\beta^*)$.

The output of the first subtracter 123 is inputted to a first controlling section 125, which multiplies the yaw rate difference $(\bar{\phi}-\phi^*)$ by a predetermined constant $-K_1$. A second controlling section 126 receives the output of the second subtracter 124, and multiplies the side slip angle difference $(\bar{\beta}-\beta^*)$ by a predetermined constant $K_2$. An adder 127 receives the outputs of the first and second controlling sections 125 and 126, determines the sum of the output of the first controlling section 125 and the output of the second controlling section 126, and delivers the sum as the target rear wheel steer angle value $\delta_R$ to the rear wheel steering regulator 5.

The steering regulator 5 varies the actual rear wheel steer angle of the controlled vehicle by supplying the hydraulic unit 7 with the fluid pressure proportional to the target rear wheel steer angle value $\bar{\delta}_R$.

The actual vehicle motion variable estimating section 128 performs mathematical operations to estimate the magnitudes of the yaw rate and side slip angle of the controlled vehicle obtained when the rear wheel steer angle of the controlled vehicle is equal to the target rear wheel steer angle value $\bar{\delta}_R$, and outputs the results of the mathematical operations as the estimated yaw rate value $\phi^*$ and the estimated side slip angle value $\beta^*$.

The estimating section 128 determines the estimated yaw rate value $\phi^*$ and the estimated side slip angle value $\beta^*$ by using an actual vehicle simulation model which is determined by actual vehicle parameters of the controlled vehicle and relationships expressing characteristics of the controlled vehicle. In this embodiment, the estimating section 128 determines $\phi^*$ and $\beta^*$ in accordance with the following equations.

$$M(\dot{V}_y + \phi V) = 2C_F + 2C_R \quad (19)$$

$$I_Z \ddot{\phi} = 2L_F C_F - 2L_R C_R \quad (20)$$

$$\beta_F = (\theta_s/N) - (V_y + L_F \phi)/V \quad (21)$$

$$\beta_R = \delta_R - (V_y - L_R \phi)/V \quad (22)$$

$$C_F = eK_F \beta_F \quad (23)$$

$$C_R = K_R \cdot \beta_R \quad (24)$$

$$V_y = \int \dot{V}_y dt \quad (25)$$

$$\phi^* = \phi = \int \ddot{\phi} \, dt \quad (26)$$

$$\beta^* = V_y/V \quad (27)$$

In the equations (19)–(27), the vehicle parameters are:
$I_Z$ = a yawing moment of inertia of the actual vehicle model representing the controlled vehicle,
M = a vehicle mass of the actual vehicle model,
$L_F$ = a distance between a front axle and a center of gravity of the actual vehicle model,
$L_R$ = a distance between a rear axle and the center of gravity of the actual vehicle model,
$eK_F$ = a front equivalent cornering power of the actual vehicle model (in which a steering stiffness is taken into account),
$K_R$ = a rear cornering power of the actual vehicle model,
N = an overall steering (gear) ratio of the actual vehicle model.
The variables are:
$\ddot{\phi}$ = a yaw acceleration of the actual vehicle model,
$\phi$ = a yaw rate of the actual vehicle model,
$\dot{V}_y$ = a side slipping acceleration of the actual vehicle model,
$V_y$ = a side slipping speed of the actual vehicle model,
$C_F$ = a front wheel cornering force of the actual vehicle model,
$C_R$ = a rear wheel cornering force of the actual vehicle model.

The estimated yaw rate value $\phi^*$ determined by the estimating section 128 is treated as a negative feedback quantity in the proportional control of the first subtracter 123 and the first controlling section 125. The estimated side slip angle value $\beta^*$ is treated as a negative feedback quantity in the proportional control of the second subtracter 124 and the second controlling means 126.

Therefore, the target rear wheel steer angle value $\delta_R$ is outputted until the estimated yaw rate value $\phi^*$ becomes equal to the desired yaw rate value $\bar{\phi}$ and simultaneously the estimated side slip angle $\beta^*$ becomes equal to the desired side slip angle value $\bar{\beta}$. That is, the rear wheels 11 and 12 are steered until the quantity expressed as $-K_1(\bar{\phi}-\phi^*)+K_2(\bar{\beta}-\beta^*)$ becomes equal to zero.

When the equation $-K_1(\bar{\phi}-\phi^*)+K_2(\bar{\beta}-\beta^*)=0$ is satisfied, the control system of the second embodiment stops steering the rear wheels, so that the actual yaw rate and the actual side slip angle of the controlled vehicle are maintained equal to the desired yaw rate value and the desired side slip angle value $\bar{\beta}$, respectively. In this way, the control system makes the characteristics of the controlled vehicle identical to the characteristics of the desired vehicle model or models.

Like the first embodiment, the control system of the second embodiment can provide the feedback vehicle control which is free from noise, and improve the accuracy in achieving the desired characteristics. Furthermore, the control system of the second embodiment can endow the controlled vehicle with more sophisticated characteristics by controlling both of a rotational motion variable (the yaw rate in the second embodiment) and a translational motion variable (the side slip angle in the second embodiment).

Figure 4A:
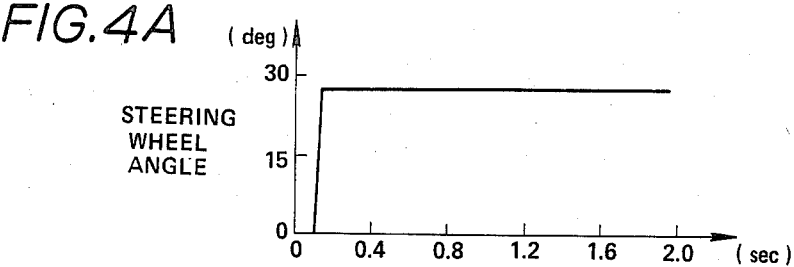
FIGS. 4A-4D are graphs showing characteristics of a vehicle controlled by the control system of the second embodiment.
Figure 4B:
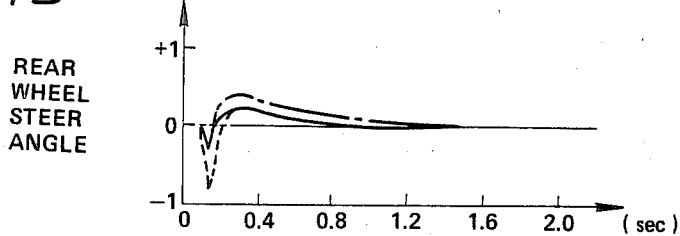
Figure 4C:
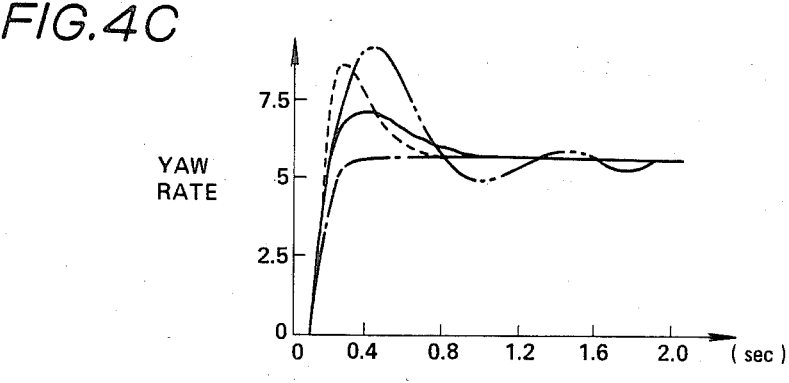
Figure 4D:
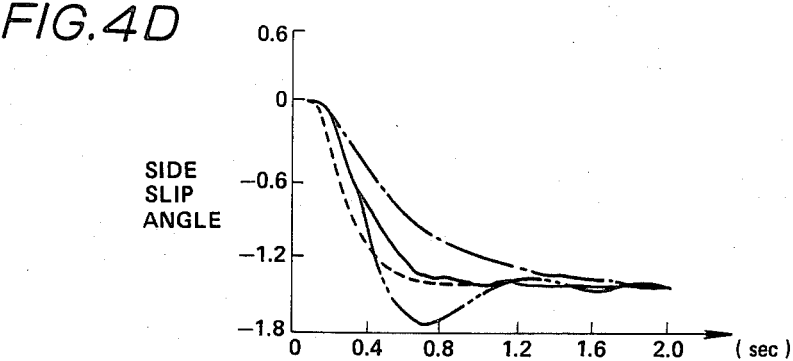

The effects of the second embodiment are shown in FIGS. 4A–4D. FIGS. 4B, 4C and 4D shows, respectively, variations of the rear wheel steer angle, yaw rate and side slip angle resulting when the steering wheel angle is changed as shown in FIG. 4A at a high vehicle speed. Solid lines show characteristics of the vehicle controlled by the system of the second embodiment. Two dot chain lines show characteristics of a conventional vehicle in which only front wheels are steered in accordance with the angular displacement of the steering wheel. Broken lines show characteristics of a vehicle in which only the side slip angle is controlled by altering the rear wheel steer angle so as to achieve desired cornering characteristics in a manner similar to the second embodiment. One dot chain lines show characteristics of a vehicle in which only the yaw rate is controlled by altering the rear wheel steer angle.

As evident from FIGS. 4B–4D, in the conventional vehicle, both of the yaw rate and side slip angle is oscillatory and unstable. In the vehicle in which only the side slip angle is controlled, the side slip angle responds speedily, but the yaw rate swings largely. In the vehicle in which only the yaw rate is controlled, the yaw rate is prevented from swinging, but the response of the side slip angle is slow.

In the controlled vehicle of the second embodiment, the response of the side slip angle is speedy, and simultaneously an overshoot of the yaw rate is sufficiently small.

In the second embodiment, it is possible to make the steady state gain of the yaw rate and the steady state gain of the side slip angle equal to each other by determining the gain $G_\phi$ and $G_\beta$ apearing in the equations (17) and (18) so as to satisfy the following equation:

$$G_\beta = \frac{1}{N} - \frac{\left(1 + \frac{M}{2L} \frac{L_R}{L_F K_F} V^2\right) L_F}{V} G_{\dot\phi}$$

In the second embodiment, the desired yaw rate value $\dot\phi$ and the desired side slip angle value $\beta$ are determined by using two different desired vehicle models. However, it is possible to determine these desired values by using a single desired vehicle model. In this case, the control system uses the single desired vehicle model which includes equations of vehicle motion, and performs mathematical operations to determine the desired values $\bar{\dot\phi}$ and $\bar\beta$ from the steering wheel angle $\theta_s$ and the vehicle speed V (as shown in a copending U.S. patent application Ser. No. 773,622, U.S. Pat. No. 4,679,809, and a West German Offenlegungsschirift No. 35 32 246 published May 20, 1986).

In the second embodiment, each of the first and second controlling sections 125 and 126 performs a proportional control action. Howevers, it is optional to arrange either or both of the first and second controlling sections 125 and 126 so as to have a proportional plus integral control action or a proportional plus integral plus derivative control action.

The control system of the second embodiment may be arranged to vary the front wheel steer angle instead of the rear wheel steer angle, or both of the front wheel and rear wheel steer angles.

As explained above, the present invention makes it possible to control the vehicle response characteristics freely. Furthermore, the feedback control of the present invention requires no sensor for sensing a vehicle motion variable such as a yaw rate sensor. Therefore, the feedback control of the present invention is free from noise attributable to vibrations of the vehicle, and makes a contribution to cost reduction by eliminating the necessity of vehicle motion variable sensors. Besides, the feedback control of the present invention requires no troublesome signal processing circuit for converting the output signal of the motion variable sensor into an appropriate signal form.

What is claimed is:

1. A control system for steering a controlled vehicle having at least one first wheel and one second wheel, comprising steering input means for determining a steering input quantity of said controlled vehicle.

actuating means for steering said controlled vehicle by varying a predetermined manipulated variable, and control means for producing a control signal to command said actuating means based upon said steering input quantity, said control means comprising first reference supplying means for determining a desired value of a predetermined first vehicle motion variable in accordance with a first desired vehicle model representing a first desired vehicle, actual motion estimating means for determining an estimated value of said first motion variable corresponding to said steering input quantity in accordance with an actual vehicle model representing said controlled vehicle, first comparing means for comparing said desired and estimated values of said first motion variable, and target manipulated variable determining means for varying said manipulated variable by producing said control signal representing a target value of said manipulated variable so as to reduce a difference between said desired and estimated values of said first motion variable.

2. A control system according to claim 1 wherein said system further comprises means for sensing a vehicle speed of said controlled vehicle, and wherein said first reference means determines said desired value corresponding to said steering input quantity and said vehicle speed, and said estimating means determines said estimated value corresponding to said steering input quantity and said vehicle speed.

3. A control system according to claim 2 wherein said steering input quantity is a steering wheel angle of said controlled vehicle which is an angular displacement of a steering wheel of said controlled vehicle, and said manipulated variable is a second wheel steer angle of said controlled vehicle which is a steer angle of said at least one second wheel.

4. A control system according to claim 3 wherein said target manipulated variable determining means determines a target value of said second wheel steer angle which is equal to a product obtained by multiplying said difference between said desired and estimated values of said first motion variable by a predetermined constant.

5. A control system according to claim 4 wherein said first reference supplying means determines said desired value of said first motion variable by solving a group of equations of vehicle motion and constraint equations by using desired values of a set of vehicle parameters representative of said first desired vehicle, and said estimating means determines said estimated value of said first motion variable by solving a group of equations of vehicle motion and constraint equations by using actual values of a set of vehicle parameters representative of said controlled vehicle.

6. A control system according to claim 5 wherein each set of said vehicle parameters comprises a yawing moment of inertia $I_Z$ of a vehicle, a vehicle mass M, a distance $L_F$ between a front axle and a center of gravity of the vehicle, a distance $L_R$ between a rear axle and the center of gravity of the vehicle, an overall steering ratio N, a cornering power $K_F$ of each of front wheels, and a cornering power $K_R$ of each of rear wheels.

7. A control system according to claim 6 wherein said group of equations of vehicle motion solved by said first reference supplying means comprises an equations of side slipping motion and an equation of yawing motion, expressed, respectively, as:

$$M(\ddot y + \dot\phi V) = 2C_F + 2C_R$$

$$I_Z \ddot\phi = 2L_F C_F - 2L_R C_R$$

where V is the vehicle speed, $\dot\phi$ is a yaw rate, $\ddot\phi$ is a yaw acceleration, $\ddot y$ is a side slipping acceleration, $C_F$ is a front wheel cornering force and $C_R$ is a rear wheel cornering force.

8. A control system according to claim 7 wherein said estimating means uses said equation of side slipping motion and said equation of yawing motion.

9. A control system according to claim 8 wherein the set of said vehicle parameters used by said first reference means further comprises a moment of inertia about a kingpin $I_K$, a steering stiffness $K_S$, a Viscosity coefficient $D_K$ of a steering system, and a trail $\zeta$, and wherein said group of equations solved by said first reference means further comprises an equation of steering system expressed as:

$$I_K \ddot{\delta}_F = N K_s(\theta_s - N \delta_F) - D_K \dot{\delta}_F - 2\varepsilon C_F$$

where $\delta_F$ is a front wheel steer angle, and $\theta_s$ is a steering wheel angle.

10. A control system according to claim 9 wherein said first motion variable is said yaw rate.

11. A control system according to claim 10 wherein said manipulated variable is a rear wheel steer angle of said controlled vehicle.

12. A control system according to claim 3 wherein said actual motion estimating means further determines an estimated value of a predetermined second vehicle motion variable corresponding to said steering wheel angle and said vehicle speed of said controlled vehicle in accordance with said actual vehicle model, wherein said control means further comprises second reference supplying means for determining a desired value of said second motion variable corresponding to said steering wheel angle and said vehicle speed of said controlled vehicle in accordance with a predetermined second desired vehicle model representing a second desired vehicle, second comparing means for comparing said desired and estimated values of said second motion variable, and wherein said target manipulated variable determining means varies said manipulated variable so as to reduce a difference between said desired and estimated values of said second motion variable.

13. A control system according to claim 12 wherein said first vehicle motion variable is a variable describing the state of a vehicle rotational motion, and said second vehicle motion variable is a variable describing the state of a vehicle translational motion.

14. A control system according to claim 13 wherein said target manipulated variable determining means comprises first controlling means for receiving as an input said difference between said desired and estimated values of said first motion variable from said first comparing means and determining a first output in accordance with a predetermined control action, second controlling means for receiving as an input said difference between said desired and estimated values of said second motion variable from said second comparing means and determining a second output in accordance with a predetermined control action, and adding means for adding said first and second outputs and producing said control signal representing a sum of said first and second outputs.

15. A control system according to claim 14 wherein said first output of said first controlling means is equal to a product obtained by multiplying a difference obtained by subtracting said estimated value of said first motion variable from said desired value of said first motion variable by $-K_1$ where $K_1$ is a predetermined constant, and said second output of said second controlling means is equal to a product obtained by multiplying a difference obtained by subtracting said estimated value of said second motion variable from said desired value of said second motion variable by $K_2$ where $K_2$ is a predetermined constant.

16. A control system according to claim 15 wherein said first motion variable is a yaw rate, and said second motion variable is a side slip angle of a vehicle center of gravity.

17. A control system according to claim 16 wherein said first reference supplying means receives said steering wheel angle as an input and delivers said desired value of said yaw rate as an output in accordance with a transfer function of a first-order lag element whose time constant is a function of said vehicle speed, and said second reference supplying means receives said steering wheel angle as an input and delivers said desired value of said side slip angle as an output in accordance with a transfer function of a second-order lag whose undamped frequency is a function of said vehicle speed.

18. A control system according to claim 17 wherein said transfer functions of said first and second reference supplying means are, respectively, expressed as:

$$R_\phi(s) = G_\phi(V) \frac{1}{1 + \tau s}$$

$$R_\beta(s) = G_\beta(V) \frac{\omega^2}{s^2 + 2\omega s + \omega^2}$$

where $R_\phi(s)$ is said transfer function of said first reference means, s is a differential operator, $G_\phi(V)$ is a first gain which is a function of said vehicle speed, $\tau$ is said time constant, $R_\beta(s)$ is said transfer function of said second reference means, $G_\beta(V)$ is a second gain which is a function of said vehicle speed, and $\beta$ is said undamped frequency.

19. A control system according to claim 18 wherein said first and second gains are determined so as to satisfy the following equation:

$$G_\beta = \frac{1}{N} - \frac{\left(1 + \frac{M}{2L} \frac{L_R}{L_F K_F} V^2\right) L_F}{V} G_\phi$$

where N is an overall steering ratio of said actual vehicle model, M is a vehicle mass of said actual vehicle model, L is a wheel base of said actual vehicle model, $L_F$ is a distance between a front axle and a center of gravity of said actual vehicle model, $L_R$ is a distance between a rear axle and the center of gravity of said actual vehicle mode, and $K_F$ is a front wheel cornering power of said actual vehicle model.

* * * * *